(12) United States Patent
Lin et al.

(10) Patent No.: US 11,899,492 B2
(45) Date of Patent: Feb. 13, 2024

(54) ELECTRONIC DEVICE

(71) Applicant: GUANGDONG OPPO MOBILE TELECOMMUNICATIONS CORP., LTD., Dongguan (CN)

(72) Inventors: Shijie Lin, Dongguan (CN); Liang Gu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 448 days.

(21) Appl. No.: 17/355,626

(22) Filed: Jun. 23, 2021

(65) Prior Publication Data
US 2021/0318720 A1    Oct. 14, 2021

Related U.S. Application Data

(63) Continuation of application No. PCT/CN2019/125936, filed on Dec. 17, 2019.

(30) Foreign Application Priority Data

Dec. 29, 2018  (CN) .......................... 201811654714.9

(51) Int. Cl.
*G06F 1/16* (2006.01)
*H01Q 5/328* (2015.01)
(Continued)

(52) U.S. Cl.
CPC .......... *G06F 1/1616* (2013.01); *G06F 1/1686* (2013.01); *H01Q 1/22* (2013.01);
(Continued)

(58) Field of Classification Search
CPC ..... G06F 1/1616; G06F 1/1686; H01Q 1/243; H01Q 1/36; H01Q 5/328; H01Q 5/335;
(Continued)

(56) References Cited

U.S. PATENT DOCUMENTS 10,079,425 B2 *  9/2018 Chun .................. H01Q 1/22
10,879,589 B2 * 12/2020 Lim ................... H01Q 5/342
(Continued)

FOREIGN PATENT DOCUMENTS

CN     106095188 A    11/2016
CN     107887696 A     4/2018
(Continued)

OTHER PUBLICATIONS

Notification to Grant Patent dated Aug. 23, 2021 for Chinese Application No. 201811654714.9.
(Continued)

*Primary Examiner* — Khai M Nguyen
(74) *Attorney, Agent, or Firm* — Sheppard, Mullin, Richter & Hampton LLP

(57) ABSTRACT

The present disclosure relates to an electronic device including a rotation shaft, a first body and a second body which are foldable or unfoldable in relation to each other around the rotation shaft. The first body has a first end surface facing away from the rotation shaft and a second end surface connected between the first end surface and the rotation shaft. A first metal member is provided on the first body, includes a first and second parts connected in such a manner that the first metal member has a bent form, and constitutes a radiator of a first antenna set. The first part is arranged on the first end surface. The second part is arranged on the second end surface. A second metal member is provided on the second body, is grounded via a first switch component configured to adjust an electrical length of the second metal member.

19 Claims, 9 Drawing Sheets

(51) Int. Cl.
  *H01Q 5/378* (2015.01)
  *H01Q 1/24* (2006.01)
  *H01Q 1/36* (2006.01)
  *H01Q 5/335* (2015.01)
  *H01Q 21/28* (2006.01)
  *H01Q 21/30* (2006.01)
  *H01Q 21/00* (2006.01)
  *H01Q 1/44* (2006.01)
  *H01Q 1/52* (2006.01)
  *H01Q 1/22* (2006.01)
  *H01Q 13/10* (2006.01)
  *H01Q 9/42* (2006.01)

(52) U.S. Cl.
  CPC ......... *H01Q 1/2291* (2013.01); *H01Q 1/243* (2013.01); *H01Q 1/36* (2013.01); *H01Q 1/44* (2013.01); *H01Q 1/52* (2013.01); *H01Q 5/328* (2015.01); *H01Q 5/335* (2015.01); *H01Q 5/378* (2015.01); *H01Q 21/00* (2013.01); *H01Q 21/28* (2013.01); *H01Q 21/30* (2013.01); *H01Q 9/42* (2013.01); *H01Q 13/10* (2013.01)

(58) Field of Classification Search
  CPC ...... H01Q 5/378; H01Q 21/28; H01Q 1/2291; H01Q 9/42; H01Q 13/10; H01Q 1/44; H01Q 1/52; H01Q 1/22; H01Q 21/00; H01Q 21/30
  See application file for complete search history.

(56) References Cited

U.S. PATENT DOCUMENTS

| | | |
|---|---|---|
| 2013/0141306 A1 | 6/2013 | Chiang et al. |
| 2014/0240178 A1 | 8/2014 | Chun et al. |
| 2017/0110786 A1 | 4/2017 | Liu |

FOREIGN PATENT DOCUMENTS

| | | |
|---|---|---|
| CN | 108140928 A | 6/2018 |
| CN | 108206329 A | 6/2018 |
| CN | 108352601 A | 7/2018 |
| CN | 108631042 A | 10/2018 |
| CN | 108879072 A | 11/2018 |
| CN | 109449569 A | 3/2019 |
| EP | 3439103 A1 | 2/2019 |
| JP | 2006279649 A | 10/2006 |
| WO | 2012111037 A1 | 8/2012 |
| WO | 2017183802 A1 | 10/2017 |

OTHER PUBLICATIONS

First Office Action from corresponding Chinese Application No. 201811654714.9, dated Jan. 5, 2021. English translation attached.

International Search Report and Written Opinion dated Mar. 25, 2020 in International Application No. PCT/CN2019/125936. English translation attached.

Lin, Shijie et al, "A dual-band dual-polarization broadband high-temperature superconducting microstrip antenna", Journal of Microwaves, Aug. 2012, pp. 160-163.

Sabapathy et al., "The effect of isolation loss towards the beam steering of a parasitic patch array antenna", IEEE International RF and Microwave Conference (RFM2013) Dec. 9-11, 2013, p. 325-328.

The Second Office Action from corresponding Chinese Application No. 201811654714.9, dated May 28, 2021. English translation attached.

Extended European Search Report dated Feb. 1, 2022 received in European Patent Application No. EP 19901928.2.

* cited by examiner

ELECTRONIC DEVICE

CROSS-REFERENCE TO RELATED APPLICATION

This present application is a continuation of International Application No. PCT/CN2019/125936, filed on Dec. 17, 2019, which claims priority to Chinese Patent Application No. 201811654714.9 entitled "ELECTRONIC DEVICE" and filed with the CNIPA on Dec. 29, 2018, the content of which is incorporated herein by reference in its entirety.

TECHNICAL FIELD

The present disclosure relates to the field of electronic devices, and more particularly, to an electronic device.

BACKGROUND

With the rapid development of the electronic device technology, display screens of electronic devices can be classified into irregularly-shaped display screens and foldable screens and so on according to different special forms. An electronic device includes an antenna provided at a part of inside and/or outside a casing of the electronic device for implementing mobile communication services. The antenna arrangement of an electronic device having a foldable display screen is still a technical problem to be solved by those skilled in the art.

SUMMARY

The present disclosure provides an electronic device. The electronic device includes a rotation shaft, a first body, and a second body. The first body and the second body are configured to be foldable or unfoldable in relation to each other around the rotation shaft. The first body has a first end surface and a second end surface. The first end surface faces away from the rotation shaft. The second end surface is connected between the first end surface and the rotation shaft. A first metal member is provided on the first body. The first metal member includes a first part and a second part that are connected in such a manner that the first metal member has a bent form. The first part is arranged on the first end surface. The second part is arranged on the second end surface. The first metal member constitutes a radiator of a first antenna set. A second metal member is provided on the second body. The second metal member is grounded via a first switch component. The first switch component is configured to adjust an electrical length of the second metal member.

BRIEF DESCRIPTION OF DRAWINGS

In order to explain the technical solutions according to the embodiments of the present disclosure more clearly, the figures that need to be used in the embodiments will be introduced briefly below. Obviously, the figures described below show only some of the embodiments of the present disclosure. Those skilled in the art can obtain other figures from these figures without any inventive efforts.

DESCRIPTION OF EMBODIMENTS

Figure 1:
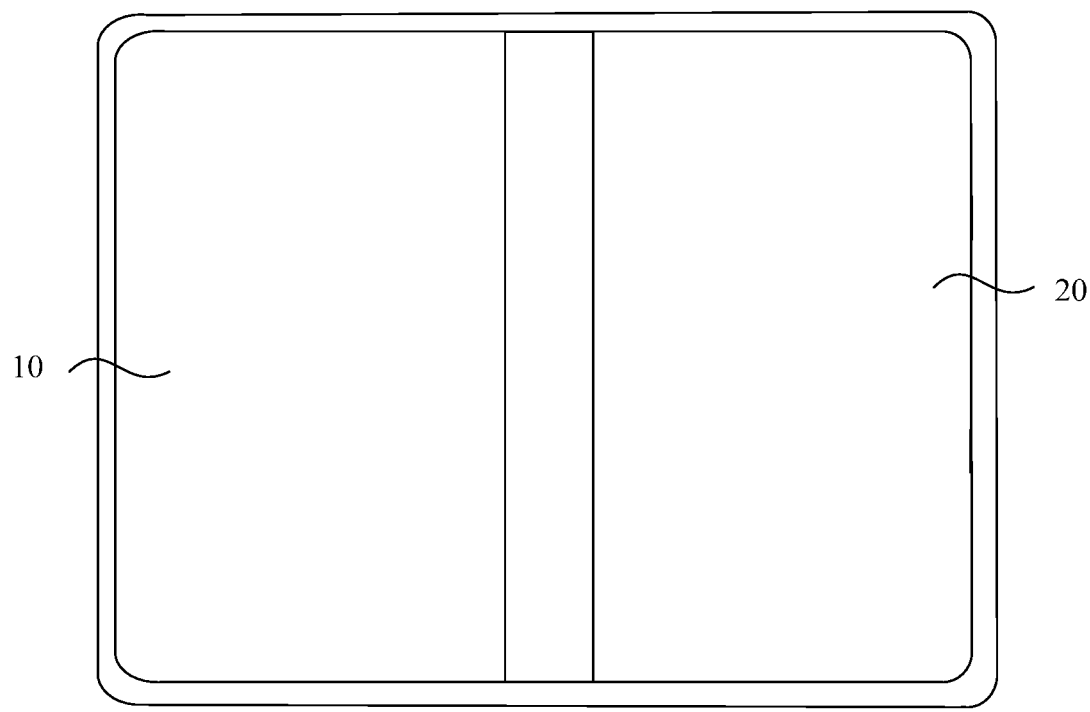
FIG. 1 is a schematic diagram showing a structure of an electronic device in an unfolded state according to a first embodiment of the present disclosure.

In a first aspect, the present disclosure provides an electronic device. The electronic device includes a rotation shaft, a first body, and a second body. The first body and the second body are configured to be foldable or unfoldable in relation to each other around the rotation shaft. The first body has a first end surface and a second end surface. The first end surface faces away from the rotation shaft. The second end surface is connected between the first end surface and the rotation shaft. A first metal member is provided on the first body. The first metal member includes a first part and a second part that are connected in such a manner that the first metal member has a bent form. The first part is arranged on the first end surface. The second part is arranged on the second end surface. The first metal member constitutes a radiator of a first antenna set. A second metal member is provided on the second body. The second metal member is grounded via a first switch component. The first switch component is configured to adjust an electrical length of the second metal member.

In a first embodiment of the first aspect, the electronic device includes a first support plate and a first frame surrounding a periphery of the first support plate. The first support plate and the first frame have a first gap formed therebetween. The first frame has a first slot and a second slot provided therein. The first slot corresponds to the first end surface. The second slot corresponds to the second end surface. The first slot and the second slot are both in communication with the first gap. A part of the first frame that is located between the first gap, the first slot and the second slot constitutes the first metal member.

In combination with the first embodiment, in a second embodiment, the first metal member is electrically connected to the first support plate via a first grounding member. A part of the first metal member that is located between the first grounding member and the second slot constitutes a radiator of a first antenna. The first antenna is a cellular communication antenna. A part of the first metal member that is located between the first grounding member and the first slot constitutes a radiator of a WIFI or GPS antenna.

In combination with the second embodiment, in a third embodiment, the electronic device further includes a rear camera fixed to the first body and is in proximity to the first grounding member.

In a fourth embodiment of the first aspect, when the first body and the second body are folded in relation to each other, the second metal member couples a first electromagnetic wave signal radiated by the first antenna set to generate a first clutter signal. The first switch component is configured to adjust the electrical length of the second metal member, in such a manner that the electrical length of the second metal member mismatches an electrical length required for radiating the first clutter signal, or a frequency band range of the first clutter signal is different from a frequency band range of the first electromagnetic wave signal.

In combination with the fourth embodiment, in a fifth embodiment, the second metal member is further grounded via a second switch component. A connection point on the second metal member at which the first switch component is electrically connected has a different position from a connection point on the second metal member at which the second switch component is electrically connected. When the first body and the second body are folded in relation to each other, the first switch component and the second switch component cooperate with each other in such a manner that the second metal member further serves as a parasitic element of the first antenna set to improve radiation performance of the first antenna set. A frequency band of the first electromagnetic wave signal when the second metal member couples the first electromagnetic wave signal radiated by the first antenna set to generate the first clutter signal is higher than a frequency band of the first electromagnetic wave signal when the second metal member serves as the parasitic element of the first antenna set.

In combination with the fifth embodiment, in a sixth embodiment, the electronic device further includes a detector and a controller. The detector is configured to detect the frequency band of the first electromagnetic wave signal radiated by the first antenna set, and the controller is configured to control an on or off state of the first switch component and an on or off state of the second switch component based on the frequency band of the first electromagnetic wave signal radiated by the first antenna set.

In combination with the sixth embodiment, in a seventh embodiment, when the frequency band of the first electromagnetic wave signal radiated by the first antenna set is within a first predetermined frequency band range, the controller is configured to control the states of the first switch component and the second switch component in accordance with a first control strategy, in such a manner that the electrical length of the second metal member mismatches the electrical length required for radiating the first clutter signal, or the frequency band range of the first clutter signal is different from the frequency band range of the first electromagnetic wave signal. When the frequency band of the first electromagnetic wave signal radiated by the first antenna set is within a second predetermined frequency band range, the controller is configured to control the states of the first switch component and the second switch component in accordance with a second control strategy, in such a manner that the second metal member serves as the parasitic element of the first antenna set.

In combination with the fourth embodiment, in an eighth embodiment, the second body has a third end surface and a fourth end surface. The third end surface faces away from the rotation shaft. The fourth end surface is connected between the third end face and the rotation shaft. The second metal member includes a third part and a fourth part that are connected in such a manner that the second metal member has a bent form. The third part is arranged on the third end face, and the fourth part is arranged on the fourth end surface.

In combination with the eighth embodiment, in a ninth embodiment, the electronic device includes a second support plate and a second frame surrounding a periphery of the second support plate. The second support plate and the second frame have a second gap formed therebetween. The second frame has a third slot and a fourth slot provided therein. The third slot corresponds to the third end surface. The fourth slot corresponds to the fourth end surface. The third slot and the fourth slot are both in communication with the second gap. A part of the second frame that is located between the second gap, the third slot and the fourth slot constitutes the second metal member.

In combination with the first embodiment, in a tenth embodiment, a third metal member is provided on the second body. The rotation shaft has a first end and a second end that are arranged in opposition to each other. The first metal member is in proximity to the first end compared to the third metal member. The third metal member is in proximity to the second end compared to the first metal member. The third metal member constitutes a radiator of a second antenna set.

In combination with the tenth embodiment, in an eleventh embodiment, the second body has a third end surface, a fourth end surface, and a fifth end surface. The third end surface faces away from the rotation shaft. The fourth end surface is arranged in opposition to the fifth end surface. The fourth end surface and the fifth end surface are both connected between the third end surface and the rotation shaft. The fourth end surface is in proximity to the first metal member compared to the fifth end surface. The third metal member includes a fifth part and a sixth part that are connected in such a manner that the third metal member has a bent form. The fifth part is arranged on the third end surface, and the sixth part is arranged on the fifth end face.

In combination with the eleventh embodiment, in a twelfth embodiment, the electronic device includes a second support plate and a second frame surrounding a periphery of the second support plate. The second support plate and the second frame have a third gap formed therebetween. The second frame has a fifth slot and a sixth slot provided therein. The fifth slot corresponds to the third end surface. The sixth slot corresponds to the fifth end surface. The fifth slot and the sixth slot are both in communication with the third gap. A part of the second frame that is located between the third gap, the fifth slot and the sixth slot constitutes the third metal member.

In combination with the twelfth embodiment, in a thirteenth embodiment, the third metal member is electrically connected to the second support plate via a second grounding member. A part of the third metal member that is located between the second grounding member and the fifth slot constitutes a radiator of the second antenna. A part of the third metal member that is located between the second grounding member and the sixth slot constitutes a radiator of a third antenna.

In combination with the eleventh embodiment, in a fourteenth embodiment, the electronic device further includes a fourth antenna arranged on the first body. The first antenna, the second antenna, the third antenna, and the fourth antenna constitute a first 4*4 MIMO antenna supporting communication in a first frequency band.

In a fifteenth embodiment, the electronic device further includes a fifth antenna, a sixth antenna, a seventh antenna, and an eighth antenna. A fourth metal member is provided on the second body. The fourth metal member is arranged at an end of the second body facing away from the rotation shaft. The fourth metal member has two opposite parts that constitute a radiator of the fifth antenna and a radiator of the sixth antenna, respectively. The seventh antenna and the eighth antenna are arranged on the second body. The fifth antenna, the sixth antenna, the seventh antenna, and the eighth antenna constitute a second 4*4 MIMO antenna supporting communication in a second frequency band.

In combination with the fifteenth embodiment, in a sixteenth embodiment, the electronic device further includes a ninth antenna, a tenth antenna, an eleventh antenna, and a twelfth antenna. A fifth metal member is provided on the first body. The fifth metal member is arranged at an end of the first body facing away from the rotation shaft. The fifth metal member has two opposite parts that constitute a radiator of the ninth antenna and a radiator of the tenth antenna, respectively. The eleventh antenna and the twelfth antenna are arranged on the first body. The fifth antenna, the sixth antenna, the seventh antenna, the eighth antenna, the ninth antenna, the tenth antenna, the eleventh antenna, and the twelfth antenna constitute an 8*8 MIMO antenna supporting communication in the second frequency band.

In combination with the eleventh embodiment, in a seventeenth embodiment, the electronic device further includes a fourth antenna arranged on the second body. The first antenna, the second antenna, the third antenna, and the fourth antenna constitute a first 4*4 MIMO antenna supporting communication in a first frequency band.

In combination with the seventeenth embodiment, in an eighteenth embodiment, the electronic device further includes a fifth antenna, a sixth antenna, a seventh antenna, and an eighth antenna. A fourth metal member is provided on the first body. The fourth metal member is arranged at an end of the first body facing away from the rotation shaft. The fourth metal member has two opposite parts that constitute a radiator of the fifth antenna and a radiator of the sixth antenna, respectively. The seventh antenna and the eighth antenna are arranged on the first body. The fifth antenna, the sixth antenna, the seventh antenna, and the eighth antenna constitute a second 4*4 MIMO antenna supporting communication in a second frequency band.

Figure 2:
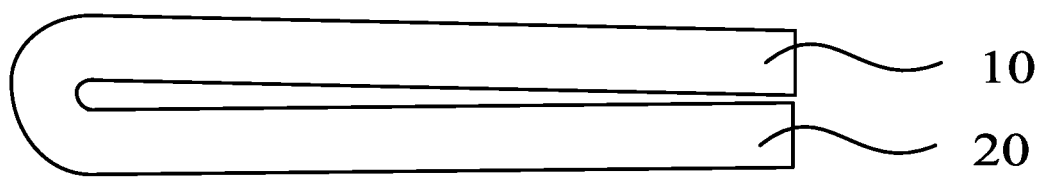
FIG. 2 is a schematic diagram showing a structure of an electronic device in a folded state according to the first embodiment of the present disclosure.
Figure 3:
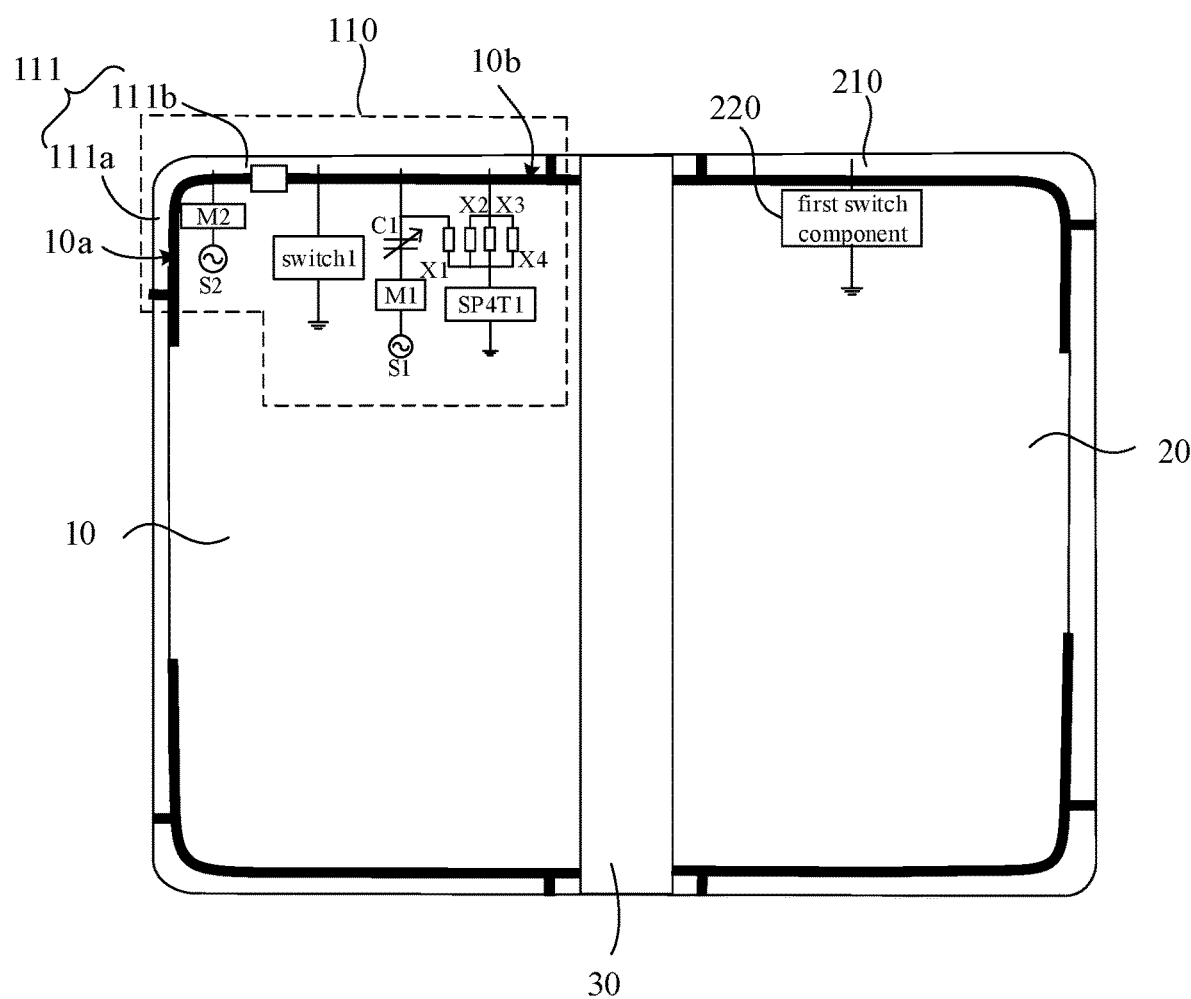
FIG. 3 is a schematic diagram showing a simple structure of an electronic device according to the first embodiment of the present disclosure.

The technical solutions according to the embodiments of the present disclosure will be described clearly and completely below with reference to the figures in the embodiments of the present disclosure. The electronic device 1 may be, but not limited to, a foldable device with a communication function, such as a foldable mobile phone or a foldable handheld computer, or the like. Reference is now made to FIG. 1, FIG. 2, and FIG. 3 together. FIG. 1 is a schematic diagram showing a structure of an electronic device in an unfolded state according to a first embodiment of the present disclosure. FIG. 2 is a schematic diagram showing a structure of the electronic device in a folded state according to the first embodiment of the present disclosure. FIG. 3 is a schematic diagram showing a simple structure of the electronic device according to the first embodiment of the present disclosure. In FIG. 3, only components relevant to this embodiment are illustrated, and other components of the electronic device 1 are omitted. The electronic device 1 includes a rotation shaft 30, a first body 10, and a second body 20. The first body 10 and the second body 20 are configured to be foldable or unfoldable in relation to each other around the rotation shaft 30. The first body 10 has a first end surface 10a and a second end surface 10b. The first end surface 10a faces away from the rotation shaft 30, and the second end surface 10b is connected between the first end surface 10a and the rotation shaft 30. A first metal member 111 is provided on the first body 10. The first metal member 111 includes a first part 111a and a second part 111b that are connected in such a manner that the first metal member 111 has a bent form. The first part 111a is arranged on the first end surface 10a, the second part 111b is arranged on the second end surface 10b, and the first metal member 111 constitutes a radiator of a first antenna set 110. A second metal member 210 is provided on the second body 20. The second metal member 210 is grounded via a first switch component 220. The first switch component 220 is configured to adjust an electrical length of the second metal member 210. The terms "first" and "second" as in the "first body 10" and "second body 20" in the present disclosure are only for the purpose of illustration and cannot be construed as indicating or implying any relative importance or implying the number of the corresponding technical features. Accordingly, other references to "first" and "second" in the present disclosure are only used for the purpose of illustration, and cannot be construed as indicating or implying any relative importance or implying the number of the corresponding technical features.

An electrical length of an antenna is generally related to a physical length of the antenna and a wavelength (frequency) radiated by the antenna. When the physical length of the antenna h≤λ/4, the electrical length he=(1/β)tan(βh/2); when the physical length of the antenna h>λ/4, the electrical length he=(1/β)(1−cos βh), where β is equal to (2π)/λ, and h is the physical length of the antenna, he is the electrical length of the antenna, and λ is the wavelength of the electromagnetic wave signal.

Only when the electrical length of the antenna matches an electrical length required for radiating an electromagnetic wave signal of a predetermined frequency, the antenna can radiate the electromagnetic wave signal of the predetermined frequency out. When the electrical length of the antenna mismatches the electrical length required for radiating the electromagnetic wave signal of the predetermined frequency, the antenna cannot radiate the electromagnetic wave signal of the predetermined frequency out.

Specifically, the first body 10 is rotatably connected with the rotation shaft 30, and the second body 20 is rotatably connected with the rotation shaft 30. When the first body 10 and the second body 20 rotate in relation to each other around the rotation shaft 30, the first body 10 and the second body 20 can be folded or unfolded in relation to each other. The electronic device 1 has a first state in which the first body 10 and the second body 20 are unfolded in relation to each other and a second state in which the first body 10 and the second body 20 are folded in relation to each other. The first state and the second state are two extreme states of the electronic device 1, and the electronic device 1 also has intermediate states between the first state and the second state. When the electronic device 1 is in the first state, the first body 10 and the second body 20 of the electronic device 1 cannot be further unfolded in relation to each other. In this case, there is no overlap between the first body 10 and the second body 20. When the electronic device 1 is in the second state, the first body 10 and the second body 20 of the electronic device 1 cannot be further folded relation to each other. In this case, the first body 10 and the second body 20 completely overlap.

In one embodiment, the first body 10 may be a first display screen, and the second body 20 may be a second display screen. As shown in FIG. 1, when the electronic device 1 is in the unfolded state, both the display surface of the first display screen and the display surface of the second display screen are exposed. As shown in FIG. 2, when the electronic device 1 is in the folded state, the display surface of the first display screen faces the display surface of the second display screen, and the distance between the display surface of the first display screen and the display surface of the second display screen cannot be further reduced. When the electronic device 1 is in the folded state, the display surface of the first display screen and the display surface of the second display screen are both blocked.

In the electronic device 1 according to the present disclosure, the first metal member 111 is provided on the first body 10, and the first metal member 111 includes two parts connected in such a manner that the first metal member 111 has a bent form. The first part 111*a* is arranged on the first end surface 10*a* facing away from the rotation shaft 30. When the first body 10 and the second body 20 are folded in relation to each other, the impact of the second body 20 on the radiator of the first antenna set 110 constituted by the first metal member 111 could be reduced. Further, the second part 111*b* is arranged on the second end surface 10*b* between the first end surface 10*a* and the rotation shaft 30, such that the space of the first body 10 could be fully utilized. The second metal member 210 is provided on the second body 20. The second metal member 210 is grounded via the first switch component 220. The first switch component 220 could adjust the electrical length of the second metal member 210. Therefore, it is possible to achieve different effects of the second metal member 210 on a first antenna set 110 according to requirements of specific scenarios.

Figure 4:
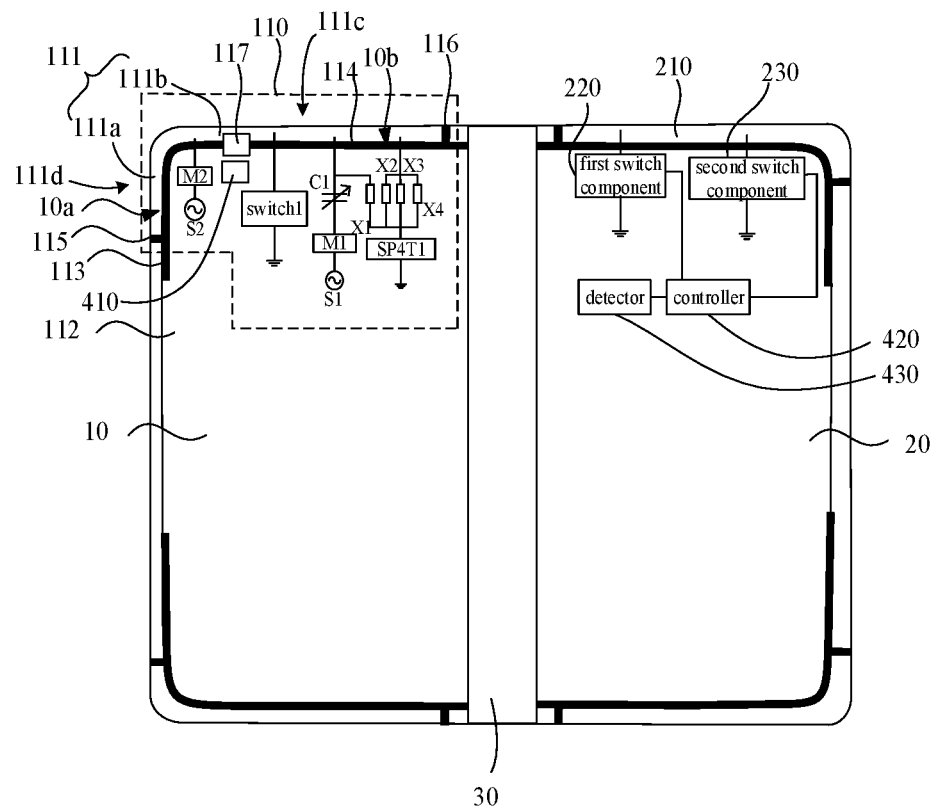
FIG. 4 is a schematic diagram showing a simple structure of an electronic device according to a second embodiment of the present disclosure.

Referring to FIG. 4, which is a schematic diagram showing a simple structure of an electronic device according to a second embodiment of the present disclosure, the electronic device according to this embodiment is substantially the same as the electronic device according to the first embodiment, and description of the features common to the first and second embodiments will be omitted here. The electronic device 1 includes a first support plate 112 and a first frame 113 surrounding a periphery of the first support plate 112. A first gap 114 is formed between the first support plate 112 and the first frame 113. The first frame 113 has a first slot 115 and a second slot 116 provided therein. The first slot 115 corresponds to the first end surface 10*a*, the second slot 116 corresponds to the second end surface 10*b*, and the first slot 115 and the second slot 116 are both in communication with the first gap 114. A part of the first frame 113 that is located between the first gap 114, the first slot 115, and the second slot 116 constitutes the first metal member 111. For example, the first slot 115 may be provided at the side where the first end surface 10 is located, and similarly, the second slot 116 may be provided at the side where the second end surface 10*b* is located.

In an embodiment, the first support plate 112 and the first frame 113 may constitute a middle frame of the electronic device 1. By machining the first gap 114, the first slot 115, and the second slot 116 on the one-piece middle frame, the first support plate 112 and the first frame 113 surrounding the periphery of the first support plate 112 can be formed. The so-called middle frame is typically a supporting structure supporting a display screen in the electronic device 1, and the middle frame is made of metal and constitutes a ground electrode of the electronic device 1.

It can be appreciated that, in other embodiments, the first support plate 112 and the first frame 113 can be two independent structures. The first frame 113 can be arranged on the periphery of the first support plate 112 such that the first gap 114, the first slot 115, and the second slot 116 can be formed between the first frame 113 and the first support plate 112. When the first support plate 112 and the first frame 113 are two independent structures, the material of the first support plate 112 may be different from the material of the first frame 113. For example, the material of the first support plate 112 may be non-metal, and the material of the first frame 113 may be metal.

Further, the first gap 114, the first slot 115, and the second slot 116 are provided with a bonding member for bonding the first support plate 112 and the first frame 113 together. The material of the bonding member may be a non-signal-shielding medium, such that the bonding member will not shield the electromagnetic wave signal radiated by the first antenna set 110.

In this embodiment, the first slot 115 provided in the first frame 113 is located on the first end surface 10*a* facing away from the rotation shaft 30. When the first body 10 and the second body 20 are folded in relation to each other, the impact of the second body 20 on the radiator of the first antenna set 110 could be reduced.

Further, the first metal member 111 is electrically connected to the first support plate 112 via a first grounding member 117. A part of the first metal member 111 that is located between the first grounding member 117 and the second slot 116 constitutes a radiator of a first antenna 111*c*. A part of the first metal member 111 that is located between the first grounding member 117 and the first slot 115 constitutes a radiator of a WIFI or GPS antenna 111*d*. Here, the first antenna 111*c* can be a cellular communication antenna. The so-called WIFI antenna is also referred to as a Wireless Fidelity (WIFI) antenna, and the so-called GPS antenna is also referred to as a Global Positioning System (GPS) antenna. The first antenna set 110 includes the first antenna 111*c* and the WIFI or GPS antenna 111*d*.

In this embodiment, when the first support plate 112 and the first frame 113 can constitute the middle frame of the electronic device 1, or when the first support plate 112 is made of a metal material, the first support plate 112 constitutes a ground electrode of the electronic device 1, and the first metal member 111 is electrically connected to the first support plate 112 via the first grounding member 117, such that the first grounding member 117 is grounded. In this case, the first ground member 117 separates the first metal member 111 into two parts, one part located between the first ground member 117 and the first slot 115, and the other part located between the first ground member 117 and the second slot 116. The part of the first metal member 111 that is located between the first grounding member 117 and the first slot 115 constitutes the radiator of the WIFI or GPS antenna 111*d*, which can support WIFI or GPS communication. The part of the first metal member 111 that is located between the first grounding member 117 and the second slot 116 constitutes the radiator of the first antenna 111*c*. The first antenna 111*c* is a cellular communication antenna and can support cellular mobile communication.

In this embodiment, the first metal member 111 is divided into two parts by providing the first grounding member 117, and each part constitutes an independent radiator. Therefore, the electronic device 1 according to the present disclosure could increase the number and types of antennas.

Further, the electronic device 1 further includes a rear camera 410 fixed to the first body 10 and in proximity to the first grounding member 117. When the user uses the first antenna set 110 in the electronic device 1 for communication (for example, making a phone call), the rear camera 410 is relatively far away from the user. The rear camera 410 is in proximity to the first grounding member 117, i.e., the first antenna set 110 is in proximity to the rear camera 410, such that the distance between the first antenna set 110 and the user is relatively large, thereby reducing the electromagnetic radiation of the electromagnetic wave signal radiated by the first antenna set 110 to the user.

Further, the second metal member 210 couples a first electromagnetic wave signal radiated by the first antenna set 110 to generate a first clutter signal, and the first switch component 220 is configured to adjust the electrical length of the second metal member 210 such that the electrical length of the second metal member 210 mismatches an electrical length required for radiating the first clutter signal, or a frequency band range of the first clutter signal is different from a frequency band range of the first electromagnetic wave signal.

In this embodiment, although the second metal member 210 couples the first electromagnetic wave signal radiated by the first antenna set 110 to generate the first clutter signal, since the electrical length of the second metal member 210 mismatches the electrical length required for radiating the first clutter signal, therefore the second metal member 210 cannot radiate the first clutter signal out, thereby avoiding the interference of the first clutter signal to the first electromagnetic wave signal. On the other hand, even if the first clutter signal is radiated out, the frequency band range of the first clutter signal is different from the frequency band range of the first electromagnetic wave signal, such that the first clutter signal cannot interfere with the first electromagnetic wave signal.

It can be appreciated that, when the second metal member 210 couples the first electromagnetic wave signal radiated by the first antenna 111c in the first antenna set 110 to generate the first clutter signal, the first switch component 220 is configured to adjust the electrical length of the second metal member 210 such that the electrical length of the second metal member 210 mismatches the electrical length required for radiating the first clutter signal, or the frequency band range of the first clutter signal is different from the frequency band range of the first electromagnetic wave signal radiated by the first antenna 111c. When the second metal member 210 couples the first electromagnetic wave signal radiated by the WIFI or GPS antenna 111d in the first antenna set 110 to generate the first clutter signal, the first switch component 220 is configured to adjust the electrical length of the second metal member 210 such that the electrical length of the second metal member 210 mismatches the electrical length required for radiating the first clutter signal, or the frequency band range of the first clutter signal is different from the frequency band range of the first electromagnetic wave signal radiated by the WIFI or GPS antenna 111d.

Further, the second metal member 210 is further grounded via a second switch component 230, and a connection point on the second metal member 210 at which the first switch component 220 is electrically connected has a different position from a connection point on the second metal member 210 at which the second switch component 230 is electrically connected. When the first body 10 and the second body 20 are folded in relation to each other, the first switch component 220 and the second switch component 230 cooperate with each other such that the second metal member 210 further serves as a parasitic element of the first antenna set 110 to improve radiation performance of the first antenna set 110. Here, a frequency band of the first electromagnetic wave signal when the second metal member 210 couples the first electromagnetic wave signal radiated by the first antenna set 110 to generate the first clutter signal is higher than a frequency band of the first electromagnetic wave signal when the second metal member 210 serves as the parasitic element of the first antenna set 110. In other words, when the first antenna set 110 operates in a high frequency band, the second metal member 210 cooperates with the first switch component 220 to avoid interference of the first clutter signal to the first electromagnetic wave signal. When the first antenna set 110 operates in the low frequency band, the second metal member 210 cooperates with the first switch component 220 and the second switch component 230 to make the second metal member 210 serve as the parasitic element of the first antenna set 110 to improve the radiation performance of the first antenna set 110.

Figure 5:
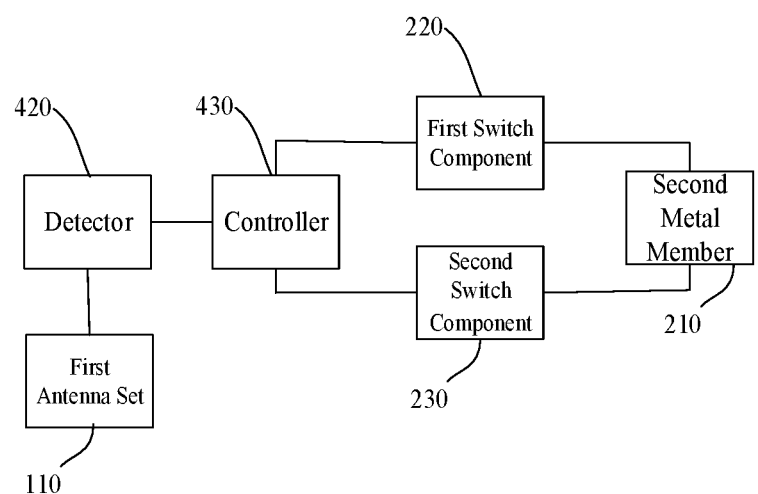
FIG. 5 is a schematic diagram showing a circuit structure of an electronic device according to the present disclosure.

Specifically, reference is now made further to FIG. 5, which is a schematic diagram showing a circuit structure of an electronic device according to the present disclosure. The electronic device 1 further includes a detector 420 and a controller 430. The detector 420 is configured to detect the frequency band of the first electromagnetic wave signal radiated by the first antenna set 110. The controller 430 is configured to control an on or off state of the first switch component 220 and an on or off state of the second switch component 230 based on the frequency band of the first electromagnetic wave radiated by the first antenna set 110.

Further, when the frequency band of the first electromagnetic wave signal radiated by the first antenna set 110 is within a first predetermined frequency band range, the controller 430 is configured to control the states of the first switch component 220 and the second switch component 230 in accordance with a first control strategy such that the electrical length of the second metal member 210 mismatches the electrical length required for radiating the first clutter signal, or the frequency band range of the first clutter signal is different from the frequency band range of the first electromagnetic wave signal. When the frequency band of the first electromagnetic wave signal radiated by the radiator of the first antenna set 110 is within a second predetermined frequency band range, the controller 430 is configured to control the states of the first switch component 220 and the second switch component 230 in accordance with a second control strategy such that the second metal member 210 serves as the parasitic element of the first antenna set 110. Here, the first predetermined frequency band may be higher than the second predetermined frequency band.

Figure 6:
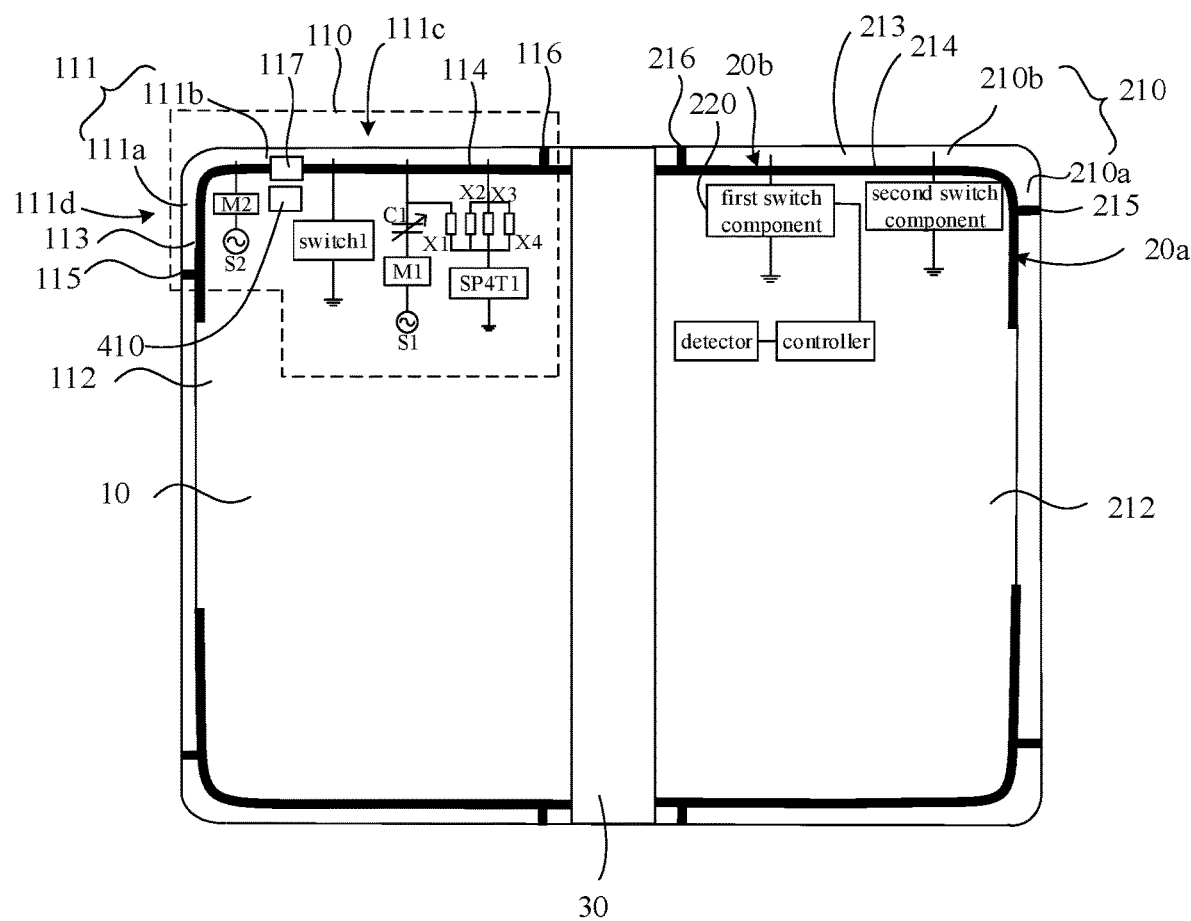
FIG. 6 is a schematic diagram showing a simple structure of an electronic device according to a third embodiment of the present disclosure.

Further, referring to FIG. 6, which is a schematic diagram showing a simple structure of an electronic device according to a third embodiment of the present disclosure, the electronic device 1 according to this embodiment is substantially the same as the electronic device 1 according to the second embodiment, and description of the features common to the second and third embodiments will be omitted here. The difference is that, in this embodiment, the second body 20 has a third end surface 20a and a fourth end surface 20b. The third end surface 20a faces away from the rotation shaft 30, the fourth end surface 20b is connected between the third end surface 20a and the rotation shaft 30, and the second metal member 210 includes a third part 210a and a fourth part 210b that are connected in such a manner that the second metal member 210 has a bent form. The third part 210a is arranged on the third end surface 20a, and the fourth part 210b is arranged on the fourth end surface 20b.

In one embodiment, the third part 210a is arranged on the third end surface 20a facing away from the rotation shaft 30. When the first body 10 and the second body 20 are folded in relation to each other, the impact of the first body 10 on the antenna radiator constituted by the second metal member 210 could be reduced. Further, the fourth part 210b is arranged on the fourth end surface 20b between the third end surface 20a and the rotation shaft 30, such that the space of the second body 20 could be fully utilized.

Further, the electronic device 1 includes a second support plate 212 and a second frame 213 surrounding a periphery of the second support plate 212. A second gap 214 is formed between the second support plate 212 and the second frame 213. The second frame 213 has a third slot 215 and a fourth slot 216 provided therein. The third slot 215 corresponds to the third end surface 20a, and the fourth slot 216 corresponds to the fourth end surface 20b. The third slot 215 and the fourth slot 216 are both in communication with the second gap 214. A part of the second frame 213 that is located between the second gap 214, the third slot 215, and the fourth slot 216 constitutes the second metal member 210. For example, the third slot 215 may be provided at the side where the third end surface 20a is located, and similarly, the fourth slot 216 may be provided at the side where the fourth end surface 20b is located.

In one embodiment, the second support plate 212 and the second frame 213 may constitute a middle frame of the electronic device 1. By machining the second gap 214, the third slot 215, and the fourth slot 216 on the one-piece middle frame, the second support plate 212 and the second frame 213 surrounding the periphery of the second support plate 212 can be formed. The so-called middle frame is typically a supporting structure supporting a display screen in the electronic device 1, and the middle frame is made of metal and constitutes a ground electrode of the electronic device 1.

It can be appreciated that, in other embodiments, the second support plate 212 and the second frame 213 can be two independent structures. The second frame 213 can be arranged on the periphery of the second support plate 212 such that the second gap 214, the third slot 215, and the fourth slot 216 can be formed between the second frame 213 and the second support plate 212. When the second support plate 212 and the second frame 213 are two independent structures, the material of the second support plate 212 may be different from the material of the second frame 213. For example, the material of the second support plate 212 may be non-metal, and the material of the second frame 213 may be metal.

Further, the second gap 214, the third slot 215, and the fourth slot 216 are provided with a bonding member for bonding the second support plate 212 and the second frame 213 together. The material of the bonding member may be a non-signal-shielding medium, such that the bonding member will not shield the electromagnetic wave signal radiated by the antenna radiator formed by the second metal member 210.

In this embodiment, the third slot 215 provided in the second frame 213 is located on the third end surface 20a facing away from the rotation shaft 30. When the first body 10 and the second body 20 are folded in relation to each other, the impact of the first body 10 on the antenna radiator formed by the second metal member 210 could be reduced.

Figure 7:
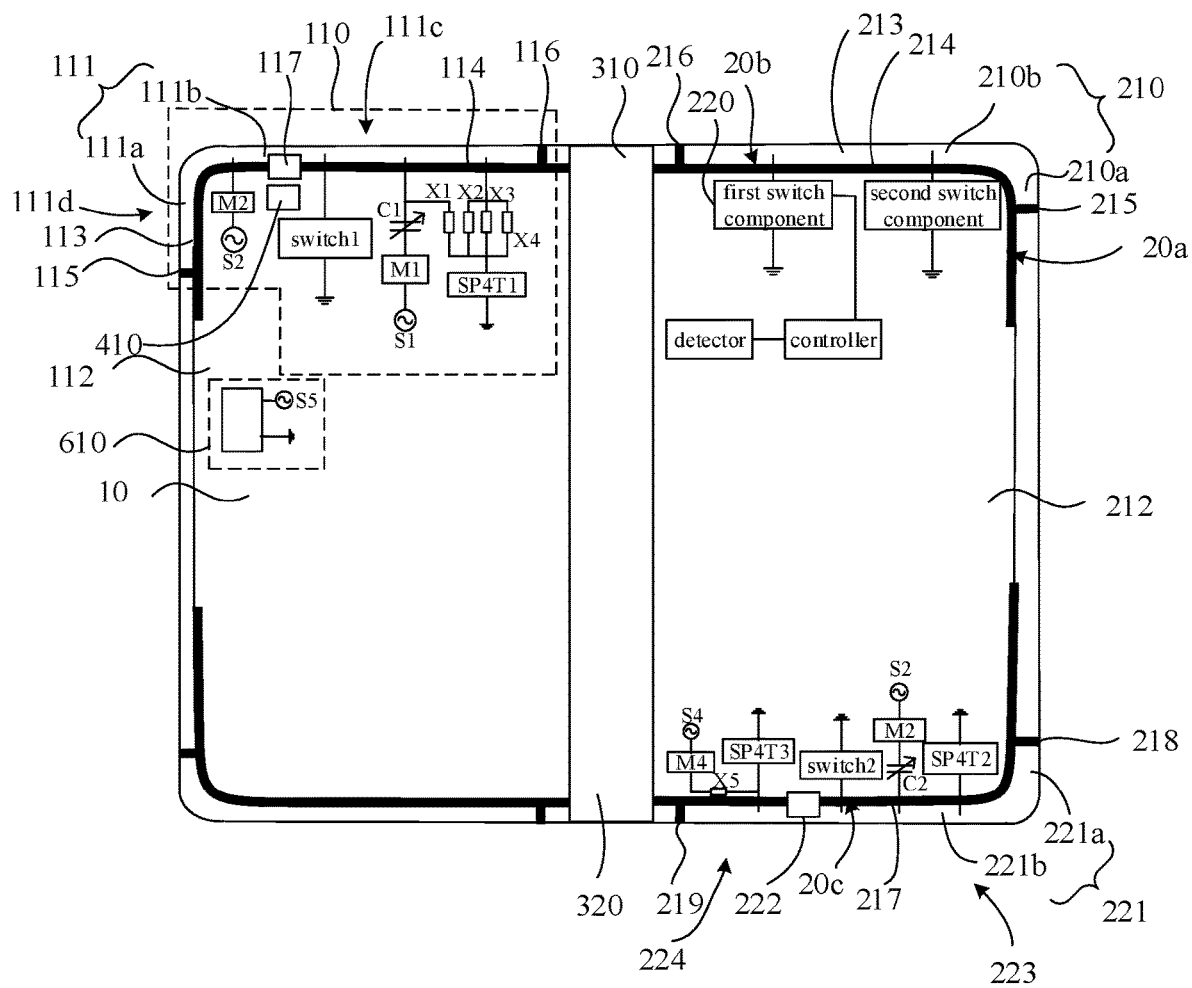
FIG. 7 is a schematic diagram showing a simple structure of an electronic device according to a fourth embodiment of the present disclosure.

Referring to FIG. 7, which is a schematic diagram showing a simple structure of an electronic device according to a fourth embodiment of the present disclosure, the electronic device 1 according to this embodiment is substantially the same as the electronic device 1 according to the third embodiment, and description of the features common to the third and fourth embodiments will be omitted here. The difference is that, in this embodiment, a third metal member 221 is provided on the second body 20, and the rotation shaft 30 has a first end 310 and a second end 320 that are arranged in opposition to each other. The first metal member 111 is in proximity to the first end 310 compared to the third metal member 221, and the third metal member 221 is in proximity to the second end 320 compared to the first metal member 111. The third metal member 221 constitutes a radiator of a second antenna set.

In this embodiment, the first metal member 111 is arranged on the first body 10 and is in proximity to the first end 310 of the rotation shaft 30, and the third metal member 221 is arranged on the second body 20 and is in proximity to the second end 320 of the rotation shaft 30. It can be seen that the first metal member 111 and the third metal member 221 form a diagonal arrangement. This arrangement could make it difficult for the user, when using the electronic device 1, to hold the first metal member 111 and the third metal member 221 at the same time, such that the communication effect of the electronic device 1 could be improved.

Further, the second body 20 has a third end surface 20a, a fourth end surface 20b, and a fifth end surface 20c. The third end surface 20a faces away from the rotation shaft 30. The fourth end surface 20b is arranged in opposition to the fifth end surface 20c, and the fourth end surface 20b and the fifth end surface 20c are both connected between the third end surface 20a and the rotation shaft 30. The fourth end surface 20b is in proximity to the first metal member 111 compared to the fifth end surface 20c. The third metal member 221 includes a fifth part 221a and a sixth part 221b connected in such a manner that the third metal member 221 has a bent form. The fifth part 221a is arranged on the third end surface 20a, and the sixth part 221b is arranged on the fifth end surface 20c.

In this embodiment, the fifth part 221a is arranged on the third end surface 20a facing away from the rotation shaft 30. When the first body 10 and the second body 20 are folded in relation to each other, the impact of the first body 10 on the antenna radiator formed by the third metal member 221 could be reduced.

Further, the electronic device 1 includes a second support plate 212 and a second frame 213 surrounding a periphery of the second support plate 212. A third gap 217 is also formed between the second support plate 212 and the second frame 213. The second frame 213 has a fifth slot 218 and a sixth slot 219. The fifth slot 218 corresponds to the third end surface 20a, the sixth slot 219 corresponds to the fifth end surface 20c, and the fifth slot 218 and the sixth slot 219 are both in communication with the third gap 217. A part of the second frame 213 that is located between the third gap 217, the fifth slot 218, and the sixth slot 219 constitutes the third metal member 221. For example, the fifth slot 218 may be provided at the side where the third end surface 20a is located, and similarly, the sixth slot 219 may be provided at the side where the fifth end surface 20c is located.

In one embodiment, the second support plate 212 and the second frame 213 may constitute a middle frame of the electronic device 1. By machining the third gap 217, the fifth slot 218, and the sixth slot 219 on the one-piece middle frame, the second support plate 212 and the second frame 213 surrounding the periphery of the second support plate 212 can be formed. The so-called middle frame is typically a supporting structure supporting the display screen in the electronic device 1, and the middle frame is made of metal and constitutes the ground electrode of the electronic device 1.

It can be appreciated that, in other embodiments, the second support plate 212 and the second frame 213 could be two independent structures. The second frame 213 can be arranged on the periphery of the second support plate 212 such that the third gap 217, the fifth slot 218, and the sixth slot 219 can be formed between the second frame 213 and the second support plate 212. When the second support plate 212 and the second frame 213 are two independent structures, the material of the second support plate 212 may be different from the material of the second frame 213. For example, the material of the second support plate 212 may be non-metal, and the material of the second frame 213 may be metal.

Further, the third gap 217, the fifth slot 218, and the sixth slot 219 are provided with a bonding member for bonding the second support plate 212 and the second frame 213 together. The material of the bonding member may be a non-signal-shielding medium, such that the bonding member will not shield the electromagnetic wave signal radiated by the antenna radiator formed by the third metal member 221.

In this embodiment, the fifth slot 218 provided in the second frame 213 is located at the third end surface 20a facing away from the rotation shaft 30. When the first body 10 and the second body 20 are folded in relation to each other, the impact of the first body 10 on the antenna radiator formed by the third metal member 221 could be reduced.

Further, the third metal member 221 is electrically connected to the second support plate 212 via a second grounding member 222. A part of the third metal member 221 that is located between the second grounding member 222 and the fifth slot 218 constitutes the radiator of the second antenna 223. A part of the third metal member 221 that is located between the second grounding member 222 and the sixth slot 219 constitutes a radiator of a third antenna 224. The second antenna set includes the second antenna 223 and the third antenna 224.

In this embodiment, the third metal member 221 is divided into two parts by providing the second grounding member 222, and each part constitutes an independent radiator. Therefore, the electronic device 1 according to the present disclosure could increase the number and types of antennas.

Further, the electronic device 1 further includes a fourth antenna 610 arranged on the first body 10. The first antenna 111c, the second antenna 223, the third antenna 224, and the fourth antenna 610 constitute a first 4*4 Multiple Input Multiple Output (MIMO) antenna supporting communication in a first frequency band.

The fourth antenna 610 may be, but not limited to, a patch antenna provided on the first body 10. The first antenna 111c, the second antenna 223, the third antenna 224, and the fourth antenna 610 form a MIMO antenna, which could increase the communication rate of the electronic device 1 during communication. In an embodiment, the first antenna 111c, the second antenna 223, the third antenna 224, and the fourth antenna 610 are Long Term Evolution (LTE) antennas.

Figure 8:
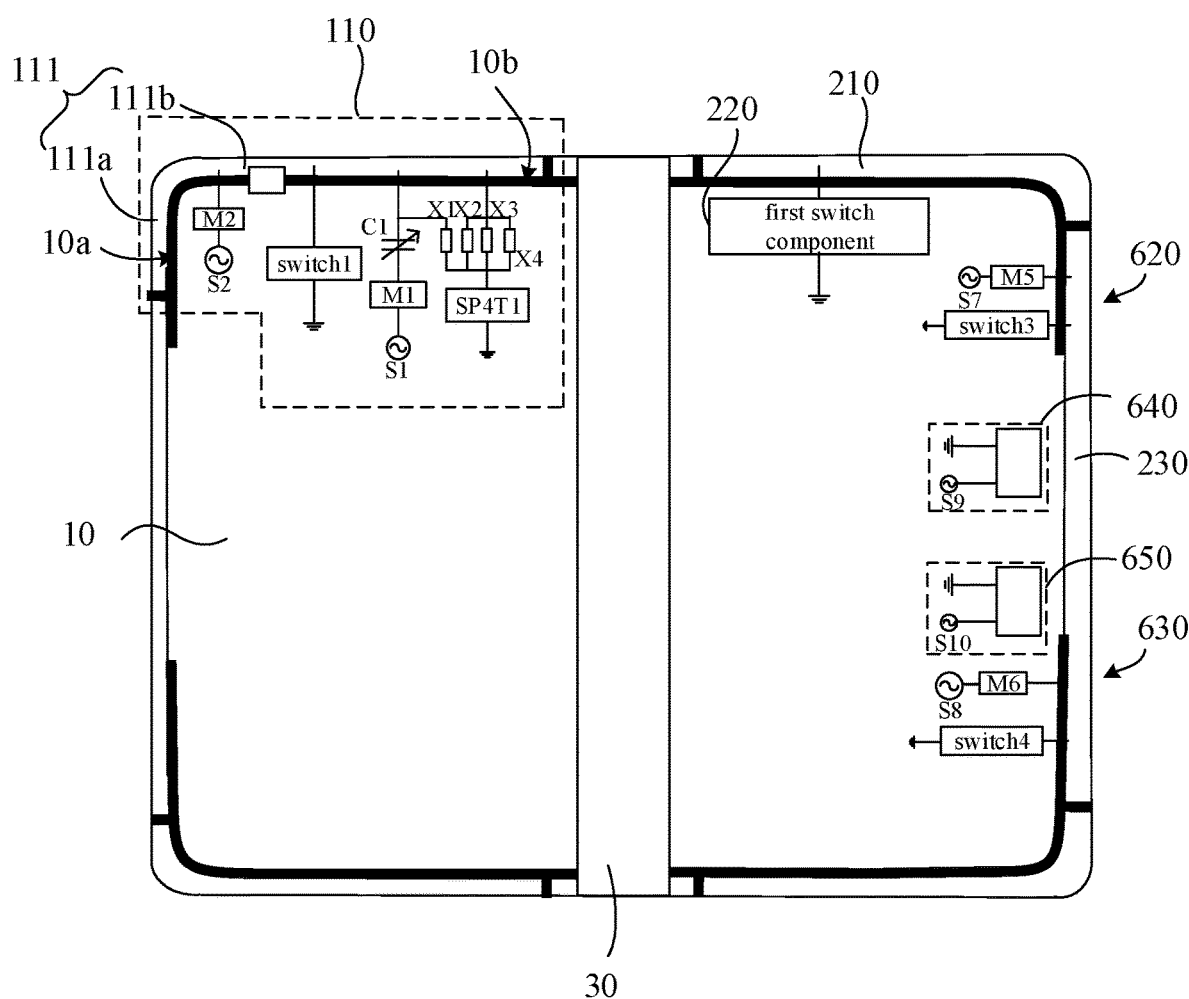
FIG. 8 is a schematic diagram showing a simple structure of an electronic device according to a fifth embodiment of the present disclosure.

Referring to FIG. 8, which is a schematic diagram showing a simple structure of an electronic device according to a fifth embodiment of the present disclosure, the electronic device 1 according to this embodiment can be combined with the electronic device 1 described in any of the above embodiments. In this embodiment, the electronic device 1 in this embodiment is combined with the electronic device 1 according to the first embodiment as an example for the purpose of illustration. The electronic device 1 further includes a fifth antenna 620, a sixth antenna 630, a seventh antenna 640, and an eighth antenna 650. A fourth metal member 230 is provided on the second body 20. The fourth metal member 230 is arranged at an end of the second body 20 facing away from the rotation shaft 30. The fourth metal member 230 has two opposite parts that constitute a radiator of the fifth antenna 620 and a radiator of the sixth antenna 630, respectively. The seventh antenna 640 and the eighth antenna 650 are arranged on the second body 20. The fifth antenna 620, the sixth antenna 630, the seventh antenna 640, and the eighth antenna 650 constitute a second 4*4 MIMO antenna supporting communication in a second frequency band.

In this embodiment, the fifth antenna 620, the sixth antenna 630, the seventh antenna 640, and the eighth antenna 650 may be antennas supporting 5G communication. The seventh antenna 640 and the eighth antenna 650 may be, but not limited to, patch antennas provided on the second body 20. The fifth antenna 620, the sixth antenna 630, the seventh antenna 640, and the eighth antenna 650 constitute a MIMO antenna, which could increase the communication rate of the electronic device 1 during communication.

Figure 9:
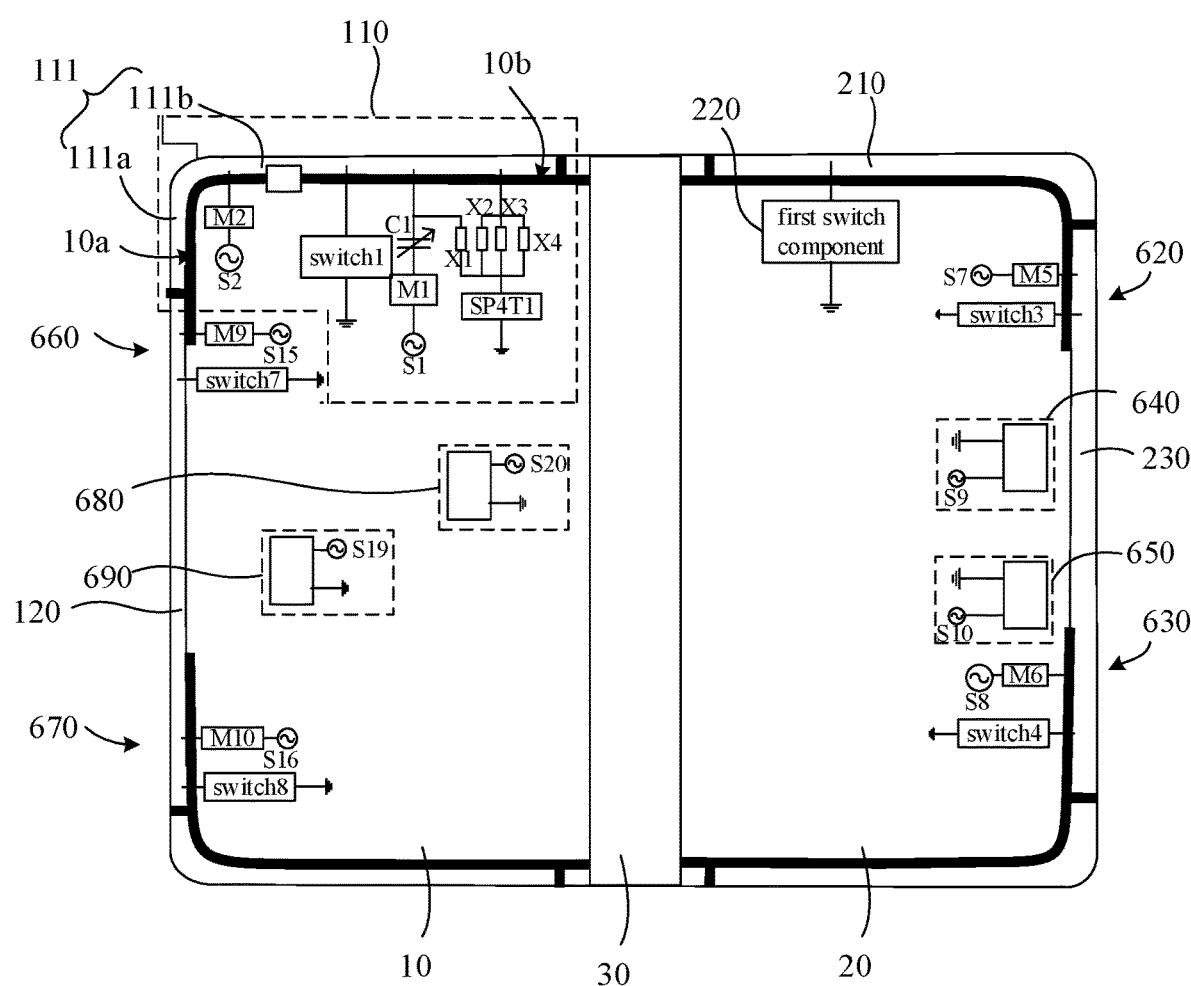
FIG. 9 is a schematic diagram showing a simple structure of an electronic device according to a sixth embodiment of the present disclosure.

Referring to FIG. 9, which is a schematic diagram showing a simple structure of an electronic device according to a sixth embodiment of the present disclosure, the structure of the electronic device 1 according to the sixth embodiment of the present disclosure is substantially the same as that of the electronic device 1 according to the fifth embodiment of the present disclosure. The difference is that the electronic device 1 further includes a ninth antenna 660, a tenth antenna 670, an eleventh antenna 680, and a twelfth antenna 690. A fifth metal member 120 is provided on the first body 10. The fifth metal member 120 is arranged at an end of the first body 10 facing away from the rotation shaft 30. The fifth metal member 120 has two opposite parts that constitute a radiator of the ninth antenna 660 and a radiator of the tenth antenna 670, respectively. The eleventh antenna 680 and the twelfth antenna 690 are arranged on the first body 10. The fifth antenna 620, the sixth antenna 630, the seventh antenna 640, the eighth antenna 650, the ninth antenna 660, the tenth antenna 670, the eleventh antenna 680, and the twelfth antenna 690 constitute an 8*8 MIMO antenna supporting communication in the second frequency band.

The eleventh antenna 680 and the twelfth antenna 690 may be, but not limited to, patch antennas provided on the first body 10. The fifth antenna 620, the sixth antenna 630, the seventh antenna 640, the eighth antenna 650, the ninth antenna 660, the tenth antenna 670, the eleventh antenna 680, and the twelfth antenna 690 constitute a MIMO antenna, which could increase the communication rate of the electronic device 1 during communication.

Figure 10:
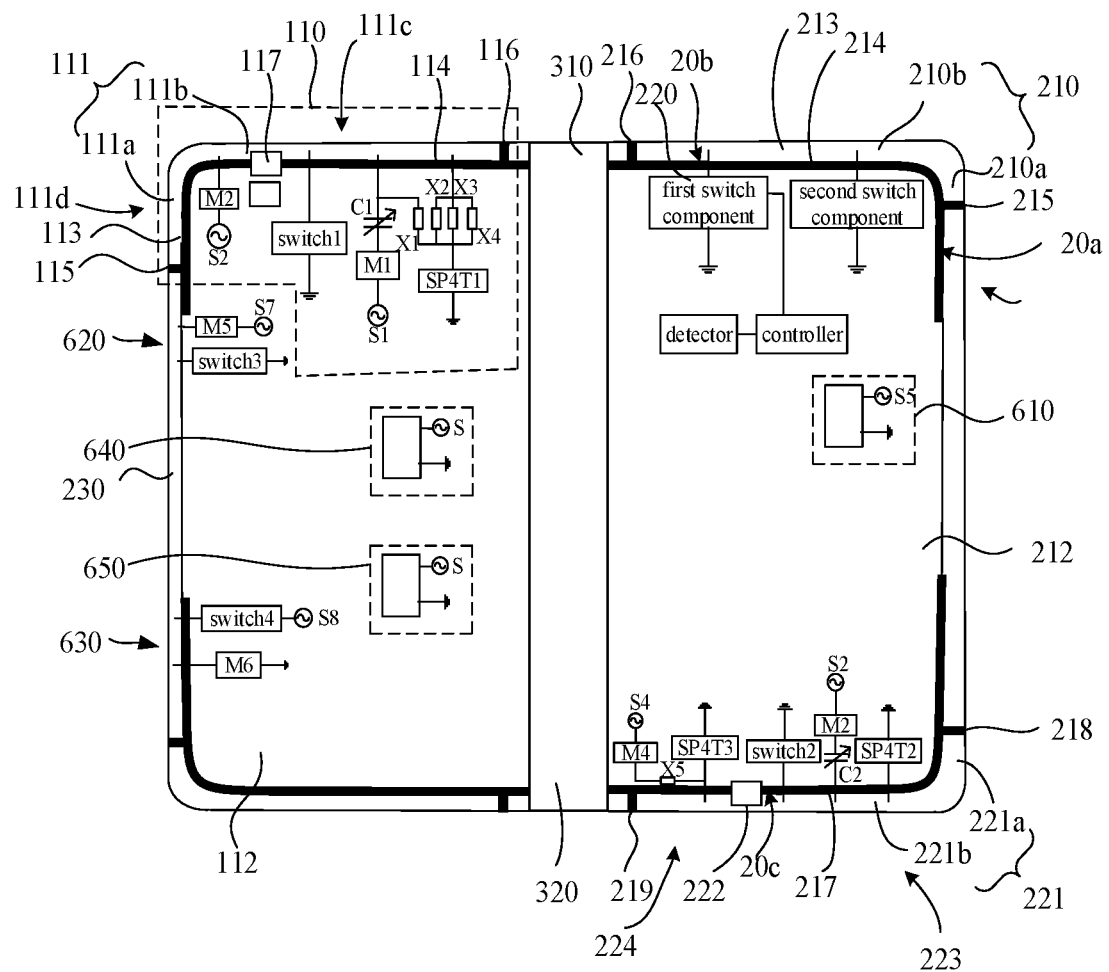
FIG. 10 is a schematic diagram showing a simple structure of an electronic device according to a seventh embodiment of the present disclosure.

Referring to FIG. 10, which is a schematic diagram showing a simple structure of an electronic device according to a seventh embodiment of the present disclosure, the electronic device 1 according to this embodiment has substantially the same structure as the electronic device 1 according to the fourth embodiment. The difference is that, in this embodiment, the fourth antenna 610 is arranged on the second body 20. The first antenna 111c, the second antenna 223, the third antenna 224, and the fourth antenna 610 constitute a first 4*4 MIMO antenna supporting communication in a first frequency band.

Further, the electronic device 1 further includes a fifth antenna 620, a sixth antenna 630, a seventh antenna 640, and an eighth antenna 650. A fourth metal member 230 is provided on the first body 10, and the fourth metal member 230 is arranged at an end of the first body 10 facing away from the rotation shaft 30. The fourth metal member 230 has two opposite parts that constitute a radiator of the fifth antenna 620 and a radiator of the sixth antenna 630, respectively. The seventh antenna 640 and the eighth antenna 650 are arranged on the first body 10. The fifth antenna 620, the sixth antenna 630, the seventh antenna 640, and the eighth antenna 650 constitute a second 4*4 MIMO antenna supporting communication in a second frequency band.

Figure 11:
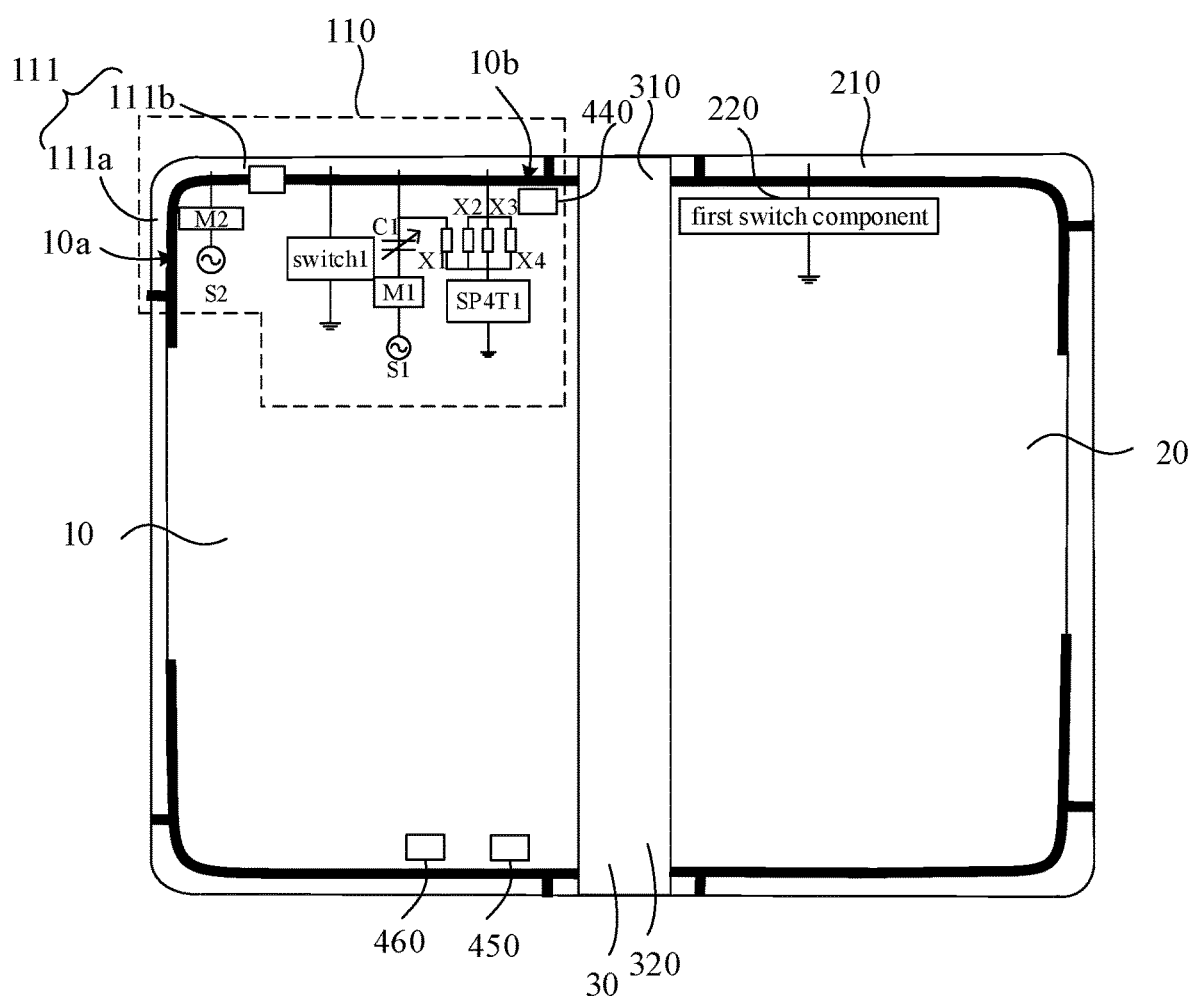
FIG. 11 is a schematic diagram showing a simple structure of an electronic device according to an eighth embodiment of the present disclosure.

Further, in combination with the electronic device 1 according to any of the above embodiments, the electronic device 1 according to the present disclosure may further include a first electroacoustic device 440 and a second electroacoustic device 450. Referring to FIG. 11, which is a schematic diagram showing a simple structure of an electronic device according to an eighth embodiment of the present disclosure, the electronic device 1 further includes the first electroacoustic device 440 and the second electroacoustic device 450 combined with the electronic device 1 described in the first embodiment as an example for the purpose of illustration. The first electroacoustic device 440 is arranged on the first body 10, and the first electroacoustic device 440 is in proximity to the first end 310 compared to the second electroacoustic device 450. The second electroacoustic device 450 is arranged on the first body 10, and the second electroacoustic device 450 is in proximity to the second end 320 compared to the first electroacoustic device 440. In one embodiment, the first electroacoustic device 440 may be an earpiece, and the second electroacoustic device 450 may be a microphone.

Further, the electronic device 1 may further include a USB interface 460. The USB interface 460 may be in proximity to the second end 320, and the USB interface 460 is farther from the rotation shaft 30 than the second electroacoustic device 450. The USB interface 460 is configured to be connected to an external USB cable for charging a battery in the electronic device 1 or for data transmission between the electronic device 1 and other electronic devices 1.

While the preferred embodiments of the present disclosure have been described above, it is to be noted that various improvements and modifications can be made by those skilled in the art without departing from the principle of the present disclosure, and these improvements and modifications are also to be encompassed by the scope of the present disclosure.

What is claimed is:

1. An electronic device, comprising a rotation shaft, a first body, and a second body, wherein the first body and the second body are configured to be foldable or unfoldable in relation to each other around the rotation shaft, the first body has a first end surface and a second end surface, the first end surface faces away from the rotation shaft, the second end surface is connected between the first end surface and the rotation shaft, a first metal member is provided on the first body, the first metal member comprises a first part and a second part that are connected in such a manner that the first metal member has a bent form, the first part is arranged on the first end surface, the second part is arranged on the second end surface, the first metal member constitutes a radiator of a first antenna set, a second metal member is provided on the second body, the second metal member is grounded via a first switch component, and the first switch component is configured to adjust an electrical length of the second metal member.

2. The electronic device of claim 1, further comprising a first support plate and a first frame surrounding a periphery of the first support plate, wherein the first support plate and the first frame have a first gap formed therebetween, the first frame has a first slot and a second slot provided therein, the first slot corresponds to the first end surface, the second slot corresponds to the second end surface, the first slot and the second slot are both in communication with the first gap, and a part of the first frame that is located between the first gap, the first slot and the second slot constitutes the first metal member.

3. The electronic device of claim 2, wherein the first metal member is electrically connected to the first support plate via a first grounding member, a part of the first metal member that is located between the first grounding member and the second slot constitutes a radiator of a first antenna, wherein the first antenna is a cellular communication antenna, and a part of the first metal member that is located between the first grounding member and the first slot constitutes a radiator of a WIFI antenna or a GPS antenna.

4. The electronic device of claim 3, further comprising a rear camera fixed to the first body and in proximity to the first grounding member.

5. The electronic device of claim 1, wherein when the first body and the second body are folded in relation to each other, the second metal member couples a first electromagnetic wave signal radiated by the first antenna set to generate a first clutter signal, and the first switch component is configured to adjust the electrical length of the second metal member, in such a manner that the electrical length of the second metal member mismatches an electrical length required for radiating the first clutter signal or a frequency band range of the first clutter signal is different from a frequency band range of the first electromagnetic wave signal.

6. The electronic device of claim 5, wherein the second metal member is further grounded via a second switch component, a connection point on the second metal member at which the first switch component is electrically connected has a different position from a connection point on the second metal member at which the second switch component is electrically connected, and when the first body and the second body are folded in relation to each other, the first switch component and the second switch component cooperate with each other in such a manner that the second metal member further serves as a parasitic element of the first antenna set to improve radiation performance of the first antenna set, wherein a frequency band of the first electromagnetic wave signal when the second metal member couples the first electromagnetic wave signal radiated by the first antenna set to generate the first clutter signal is higher than a frequency band of the first electromagnetic wave signal when the second metal member serves as the parasitic element of the first antenna set.

7. The electronic device of claim 6, further comprising a detector and a controller, wherein the detector is configured to detect the frequency band of the first electromagnetic wave signal radiated by the first antenna set, and the controller is configured to control an on or off state of the first switch component and an on or off state of the second switch component based on the frequency band of the first electromagnetic wave signal radiated by the first antenna set.

8. The electronic device of claim 7, wherein when the frequency band of the first electromagnetic wave signal radiated by the first antenna set is within a first predetermined frequency band range, the controller is configured to control the states of the first switch component and the second switch component in accordance with a first control strategy, in such a manner that the electrical length of the second metal member mismatches the electrical length required for radiating the first clutter signal or the frequency band range of the first clutter signal is different from the frequency band range of the first electromagnetic wave signal; and wherein when the frequency band of the first electromagnetic wave signal radiated by the first antenna set is within a second predetermined frequency band range, the controller is configured to control the states of the first switch component and the second switch component in accordance with a second control strategy, in such a manner that the second metal member serves as the parasitic element of the first antenna set.

9. The electronic device of claim 5, wherein the second body has a third end surface and a fourth end surface, the third end surface faces away from the rotation shaft, the fourth end surface is connected between the third end face and the rotation shaft, the second metal member comprises a third part and a fourth part that are connected in such a manner that the second metal member has a bent form, the third part is arranged on the third end face, and the fourth part is arranged on the fourth end surface.

10. The electronic device of claim 9, further comprising a second support plate and a second frame surrounding a periphery of the second support plate, the second support plate and the second frame have a second gap formed therebetween, the second frame has a third slot and a fourth slot provided therein, the third slot corresponds to the third end surface, the fourth slot corresponds to the fourth end surface, the third slot and the fourth slot are both in communication with the second gap, and a part of the second frame that is located between the second gap, the third slot and the fourth slot constitutes the second metal member.

11. The electronic device of claim 2, wherein a third metal member is provided on the second body, the rotation shaft has a first end and a second end that are arranged in opposition to each other, the first metal member is closer to the first end than the third metal member, the third metal member is closer to the second end than the first metal member, and the third metal member constitutes a radiator of a second antenna set.

12. The electronic device of claim 11, wherein the second body has a third end surface, a fourth end surface, and a fifth end surface, the third end surface faces away from the rotation shaft, and the fourth end surface is arranged in opposition to the fifth end surface, the fourth end surface and the fifth end surface are both connected between the third end surface and the rotation shaft, the fourth end surface is closer to the first metal member than the fifth end surface, the third metal member comprises a fifth part and a sixth part that are connected in such a manner that the third metal member has a bent form, the fifth part is arranged on the third end surface, and the sixth part is arranged on the fifth end face.

13. The electronic device of claim 12, further comprising a second support plate and a second frame surrounding a periphery of the second support plate, the second support plate and the second frame have a third gap formed therebetween, the second frame has a fifth slot and a sixth slot provided therein, the fifth slot corresponds to the third end surface, the sixth slot corresponds to the fifth end surface, the fifth slot and the sixth slot are both in communication with the third gap, and a part of the second frame that is located between the third gap, the fifth slot and the sixth slot constitutes the third metal member.

14. The electronic device of claim 13, wherein the third metal member is electrically connected to the second support plate via a second grounding member, a part of the third metal member that is located between the second grounding member and the fifth slot constitutes a radiator of a second antenna, and a part of the third metal member that is located between the second grounding member and the sixth slot constitutes a radiator of a third antenna.

15. The electronic device of claim 14, further comprising a fourth antenna arranged on the first body, wherein the first metal member is electrically connected to the first support plate via a first grounding member, a part of the first metal member that is located between the first grounding member and the second slot constitutes a radiator of a first antenna, and wherein the first antenna, the second antenna, the third antenna, and the fourth antenna constitute a first 4*4 MIMO antenna supporting communication in a first frequency band.

16. The electronic device of claim 1, further comprising a fifth antenna, a sixth antenna, a seventh antenna, and an eighth antenna, wherein a fourth metal member is provided on the second body, the fourth metal member is arranged at an end of the second body facing away from the rotation shaft, the fourth metal member has two opposite parts that constitute a radiator of the fifth antenna and a radiator of the sixth antenna, respectively, the seventh antenna and the eighth antenna are arranged on the second body, and the fifth antenna, the sixth antenna, the seventh antenna, and the eighth antenna constitute a second 4*4 MIMO antenna supporting communication in a second frequency band.

17. The electronic device of claim 16, further comprising a ninth antenna, a tenth antenna, an eleventh antenna, and a twelfth antenna, wherein a fifth metal member is provided on the first body, the fifth metal member is arranged at an end of the first body facing away from the rotation shaft, the fifth metal member has two opposite parts that constitute a radiator of the ninth antenna and a radiator of the tenth antenna, respectively, the eleventh antenna and the twelfth antenna are arranged on the first body, the fifth antenna, the sixth antenna, the seventh antenna, the eighth antenna, the ninth antenna, the tenth antenna, the eleventh antenna, and the twelfth antenna constitute an 8*8 MIMO antenna supporting communication in the second frequency band.

18. The electronic device of claim 14, further comprising a fourth antenna arranged on the second body, wherein the first metal member is electrically connected to the first support plate via a first grounding member, a part of the first metal member that is located between the first grounding member and the second slot constitutes a radiator of a first antenna, and wherein the first antenna, the second antenna, the third antenna, and the fourth antenna constitute a first 4*4 MIMO antenna supporting communication in a first frequency band.

19. The electronic device of claim 18, further comprising a fifth antenna, a sixth antenna, a seventh antenna, and an eighth antenna, wherein a fourth metal member is provided on the first body, the fourth metal member is arranged at an end of the first body facing away from the rotation shaft, the fourth metal member has two opposite parts that constitute a radiator of the fifth antenna and a radiator of the sixth antenna, respectively, the seventh antenna and the eighth antenna are arranged on the first body, and the fifth antenna, the sixth antenna, the seventh antenna, and the eighth antenna constitute a second 4*4 MIMO antenna supporting communication in a second frequency band.

* * * * *